Jan. 6, 1948.  F. W. GAY  2,433,896
MEANS FOR STORING FLUIDS FOR POWER GENERATION
Filed April 16, 1943  3 Sheets-Sheet 1
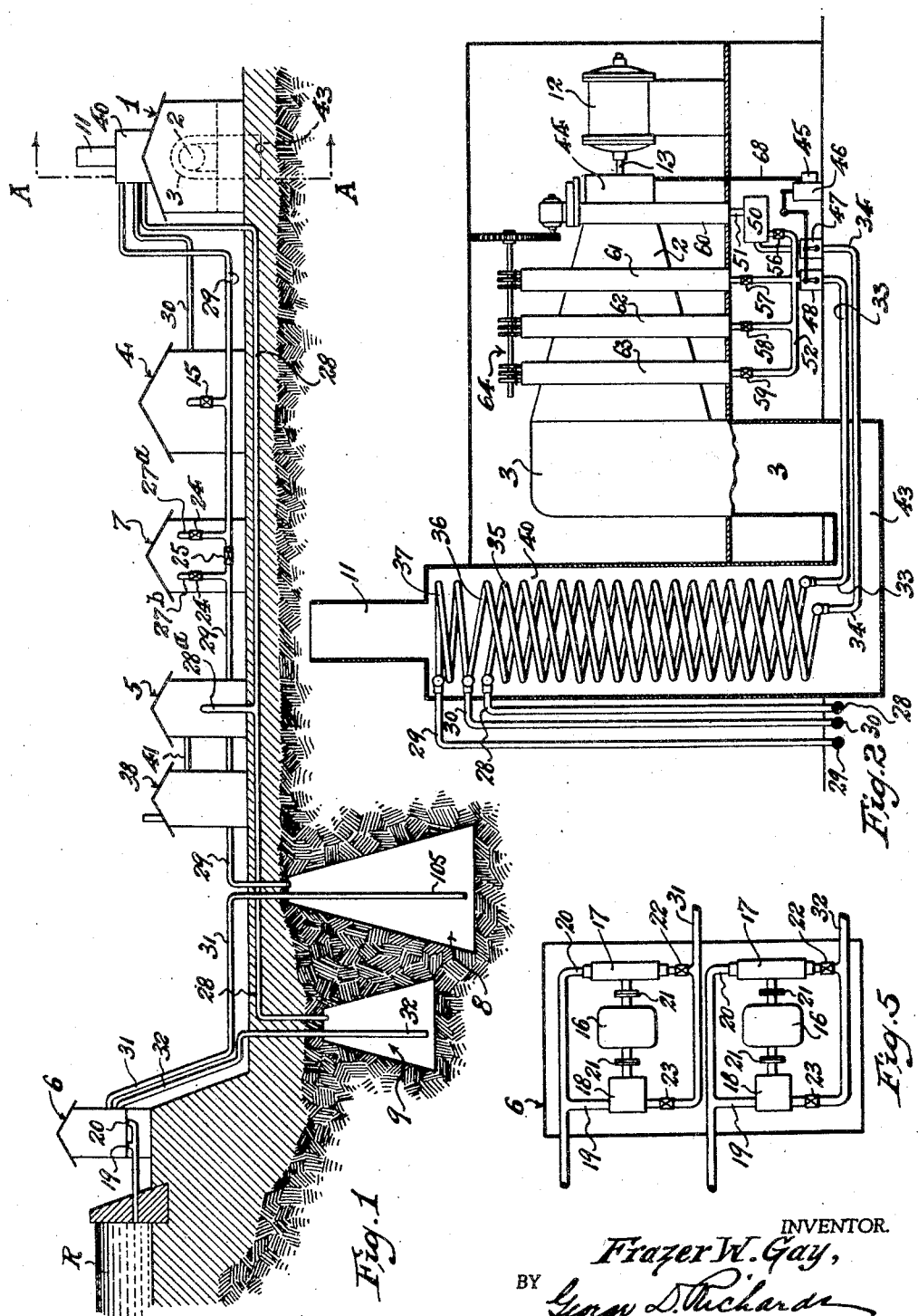
INVENTOR.
Frazer W. Gay,
BY George D. Richards
ATTORNEY.

Jan. 6, 1948.    F. W. GAY    2,433,896
MEANS FOR STORING FLUIDS FOR POWER GENERATION
Filed April 16, 1943    3 Sheets-Sheet 2
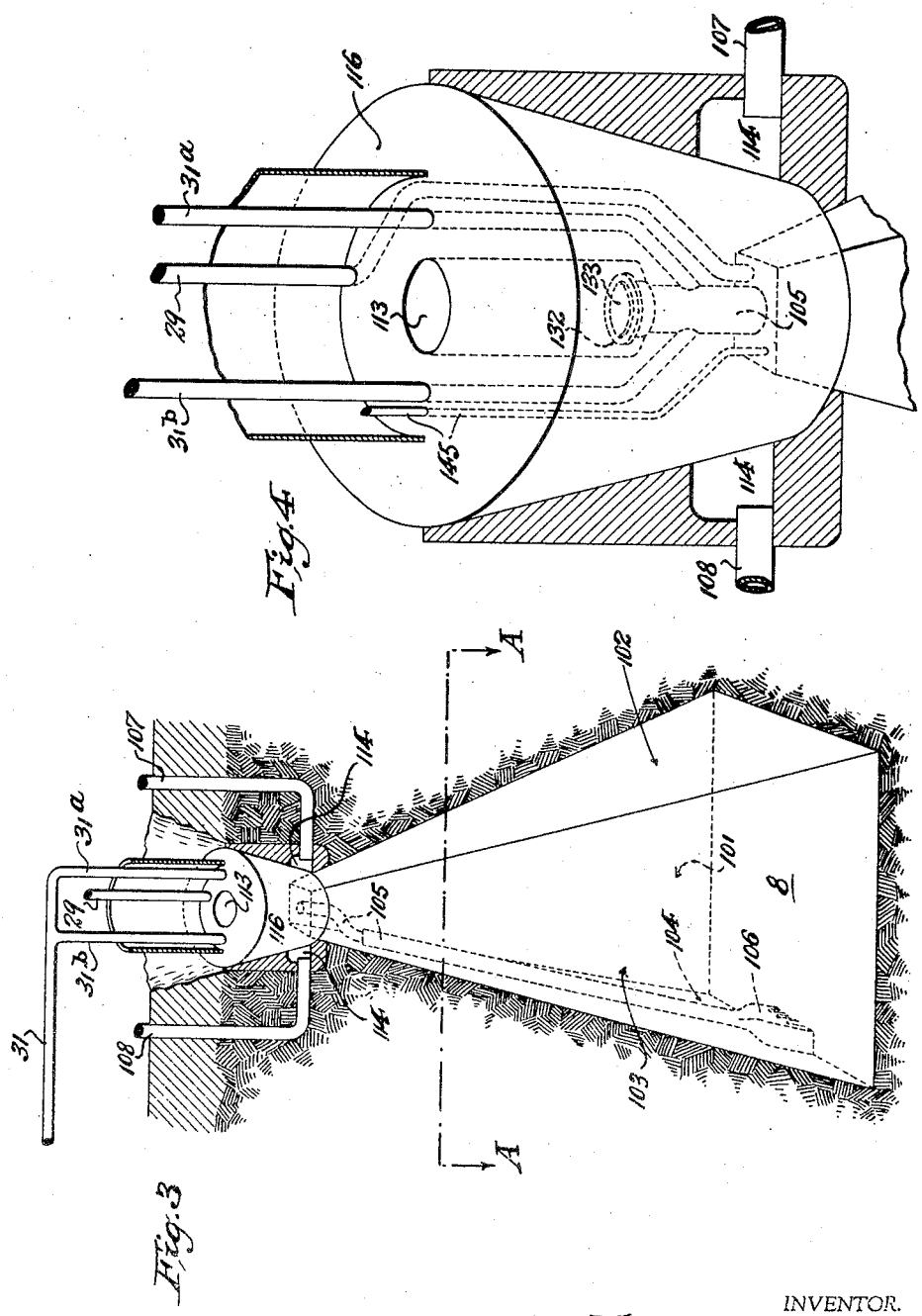
INVENTOR.
Frazer W. Gay,
BY George D. Richards
ATTORNEY.

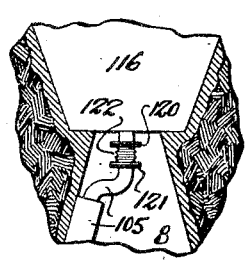
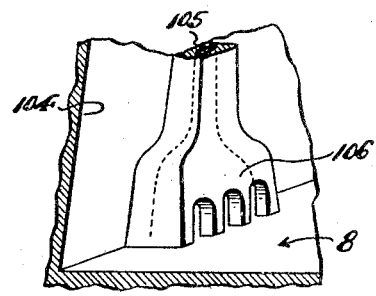
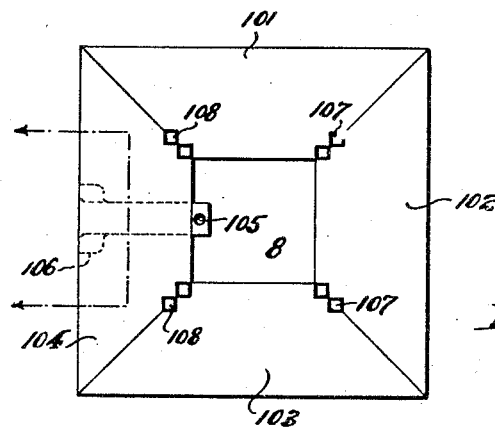
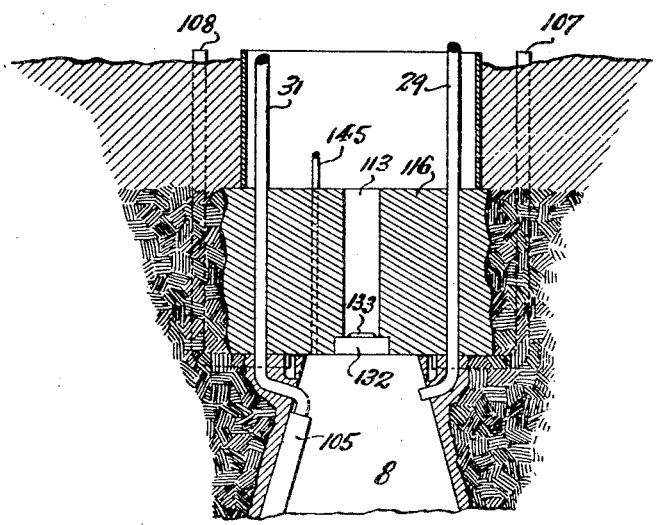

Patented Jan. 6, 1948

2,433,896

UNITED STATES PATENT OFFICE 2,433,896

MEANS FOR STORING FLUIDS FOR POWER GENERATION

Frazer W. Gay, Metuchen, N. J.

Application April 16, 1943, Serial No. 483,361

2 Claims. (Cl. 72—11)

In the piping of natural gas to remote locations, it is found that the pipeline is worked at full capacity only for a relatively small number of days per year, while the gas companies ability to sell gas is limited by the capacity of the pipe at times of maximum demand. In favorable locations it has been found possible to pump this gas into exhausted gas wells during periods of light load and make this compressed gas available during periods of heavy load, whereby the pipeline is used for a much longer time at more nearly its maximum capacity. Wells are generally located at great depth under the earth's surface where geological formations are such that it has been possible for the gas wells to contain gas at great pressure for many centuries without serious leakage.

In the present invention, I propose to provide equivalent storage space for gas relatively close to the earth's surface and, furthermore, to make this storage space available for the storing of compressed air to be used for power generation purposes during periods of heavy power load, as well as for natural or manufactured gas, butane, propane or other fluids.

The invention in general comprises the construction of huge caverns located comparatively close to the earth's surface. To make this construction possible, it is proposed to construct the caverns of pyramidal form so that those portions of the caverns relatively close to the earth's surface will have a relatively small area of cross section and the weight of the overburden of rock and earth will be sufficient to sustain the pressure on this section. It follows, of course, that as the depth into the ground progresses, the area of this cross section may correspondingly increase, since it is well known that in forcing a plug out of masonry of any sort, or even earth, the cleavage section increases in area as the distance increases from the point of application of force. For this reason the permissible area of a cross section will increase with depth. This increase will be in geometric rather than arithmetic progression. It is further proposed to make the surfaces of the cavern flat so that the pressure on all cavern surfaces is everywhere normal to the surface and, thereby, there is no tendency for the pressure within the chamber to open up cracks in the sides, except at those lines where two flat surfaces meet to form an angle. In my U. S. Patent No. 2,384,246, dated September 4, 1945, I show a method of sealing the cracks in such a chamber by the introduction of a sealing duct along the crack. This sealing duct is split so that one-half of the duct is securely attached to the edge of one of the surfaces and the other half of the duct is securely attached to the edge of the adjacent surface. Hydraulic pressure is maintained within this sealing duct every where greater than the gas pressure within the cavern, so that at all points along every crack liquid will leak into the cavern, and at no point along any crack will gas leak into the sealing duct. The method of maintaining this pressure is clearly described in the above mentioned patent application, also the method of draining away any liquid leaking outwardly from the above mentioned sealing duct. Liquid leaking into the cavern immediately falls to the bottom and becomes a part of the displacing liquid which is under control.

I propose to seal the top of the pyramid chamber with a concrete cork or stopper which rests securely on the small polygon section constituting the top of the chamber. This concrete stopper may be cast into the rock or in the preferred form it is of such a weight that in conjunction with the overburden of earth above it, there is a mass having a much greater down force (by weight) than the total upward pressure of the gas within the chamber on the bottom of the concrete cork or stopper.

I further propose to carry through the stopper, and preferably down one of the side walls, a relatively large duct or pipe arranged to conduct liquid from the bottom of the underground chamber to the surface. When the chamber is being filled with gas, the liquid in the bottom of the chamber will be allowed to flow out under the great force of the gas pressure and the energy of the escaping liquid will be absorbed by the use of Pelton waterwheels or other hydro power utilizing devices. When the gas chamber is being discharged, liquid will be pumped through this pipe into the bottom of the chamber, thereby displacing gas at the desired rate. By this means both the temperature and pressure of the gas within the chamber will be maintained continuously at a substantially constant value.

In general, it is proposed to provide two separate gas pumping stations (which may be incorporated under one roof) and a gas producer. One of these pumping stations will pump air up to a pressure of approximately 100 atmospheres for use in power generating equipment during heavy load periods and for storage in the above described underground chamber during light load periods. The other pumping station which is of smaller size will receive gas from the gas producer and pump this gas into a separate underground chamber during off-peak periods for use on peak periods.

In general, I prefer to locate the hydraulic equipment for pumping liquid into my storage chambers at as great an elevation as possible, preferably in the surrounding hills or mountains, so that the minimum amount of expensive peak load power may be required to pump liquid into the chamber to displace gas for use at heavy loads, and conversely a minimum amount of cheap off-peak power will be produced at night. Not only will the air that is being compressed during periods of heavy loads be passed through gas turbines but in addition air and gas will be displaced from the great underground chambers to supplement the air and gas pumped during heavy load periods and all the air and gas so handled will be passed through gas turbines and expanded substantially isothermally at very high temperature. I may wish to refrigerate the gas passing into either one or both of these chambers so as to provide a greater mass of gas in a given chamber space by reason of its greater density at low temperature.

In general, I propose to provide an air storage of such huge proportions and air pumping equipment of such a size that the air pumping equipment operating from Friday night to Monday morning (a period of 60 hours) and solely for pumping to storage, will completely fill the storage chamber with compressed air at a high pressure, say at 100 atmospheres, and the gas producer equipment and its pumping equipment will simultaneously operate to fill the gas storage reservoir during the same period of 60 hours. It is proposed to operate the gas turbine power generating equipment for approximately 12 hours per day for 5 days, that is for approximately 60 hours per week. It is to be understood that almost any other desired method of operation may be used and this proposed method is merely given by way of illustration. The pumping rate measured in volume of liquid displaced will, therefore, be the total volume of the air chamber divided by 60; the total amount of gas pumped during a week will be the pumping rate per hour multiplied by 168 hours per week; and the utilization rate will be the total pumped in a week divided by 60. Therefore, the utilization rate under this proposed application wil be approximately 2.8 times the pumping rate, and if it be assumed that by reason of the isothermal expansion of the gas through a suitably designed turbine operating with a very high and substantially constant gas temperature, it is possible to obtain twice as much power during the expansion of the gas than was expended in its compression; the 12 hours per day output rate will be approximately 5.6 time the pumping rate and the net power output will be approximately 4.6 times the pumping rate.

It will be obvious to those skilled in the art that it will be possible to completely discharge this chamber daily while operating on a 12 hour cycle, and under these conditions the pumping rate would have to be $\frac{1}{12}$ the air chamber capacity since the chamber would be empty in the evening and must be full in the morning. The utilization rate would be double the pumping rate and if, as mentioned above, the utilization by the addition of heat should give twice as much energy as the pumping energy required, the utilization rate would be four times the pumping rate or the net electric power available would be three times the pumping rate. The pumping rate total under this second arrangement would have to be five times as great as under the first arrangement, while the net utilization output would be approximately 3.26 times as great as in the first instance. The detail design of the gas turbine necessary to expand the gas at substantially constant temperature was the subject of my separate U. S. patent application, Serial No. 483,362, filed April 16, 1943, which application has since become abandoned, and no claim is made for any of the details in this application except for the application of such a turbine to an air storage as described or to a combined gas and air storage. In the turbine in question, the gas expanding within the turbine is provided with heat generated by internal combustion. This combustion is arranged to generate heat at substantially the rate at which heat is transferred to mechanical energy in the body of the turbine.

The exhaust gases from the turbine are passed through a heat exchanger to atmosphere. This heat exchanger is comprised of a portion devoted to transferring heat from the exhaust burned gases to the compressed air and another portion to transferring heat from the exhaust burned gases to the compressed unburned gas. If refrigeration of the compressed air is used, an additional section of the heat exchanger located in the exhaust flue gases where they enter the flue may be allocated to this cold air and the refrigerated air from the underground chamber may be heated up in this section (if desired) to approximately the temperature of the gas coming from the air compressor. This refrigerated and warmed up air is added to the air coming directly from the compressor and the gases thus mixed pass on through the balance of the heat exchanger.

An object of the present invention is to provide underground a cavern in the form of a pyramid with flat surfaces. The direction of pressure on any side surface is only inclined slightly above a horizontal line and the area of the surface exposed to this great pressure diminishes as the depth diminishes.

A further object of this invention is to provide a huge concrete cork or stopper to close the top of the underground cavern adapted, together with the overburden of earth above it, to withstand the total gaseous pressure on the relatively small surface exposed to the gases at the top of said underground chamber.

Another object of the present invention is to provide around the bottom of the concrete cork or stopper described in the previous paragraph, a large duct communicating to the surface of the earth and to down passages along the corners, so that pressure cannot accumulate due to leakage and raise the stopper to thereby too rapidly release the enormous energy pent up within the cavern.

Another object of the present invention is to displace the liquid with gas during the charging operation and to displace the gas with liquid during the discharging operation, whereby the temperature and pressure within the chamber are maintained substantially constant.

It is a further object of this invention to provide a liquid reservoir at such an elevation above the bottom of the chamber that the hydraulic head from this reservoir to the bottom of the chamber very nearly balances the gas pressure within the chamber when the chamber is full of gas and to provide pumping means and hydro utilization means to force liquid into the chamber or to utilize the energy of the liquid flowing out of the chamber.

It is a further object of the present invention to provide a refrigerating device to lower the temperature of air or gas passing to the underground storage, so that the density of the air or gas may be increased and the amount of air or gas stored may be thereby correspondingly increased. In the preferred form of the invention, I employ refrigeration to lower the temperature of the stored air or gas to a few degrees above the freezing point of water.

It is a further object of this invention to provide two reservoirs, one for the storage of gas and one for the storage of air, and to make the volumes of these two chambers proportional to the quantity of air and the quantity of gas used respectively in a gas turbine, as described, to expand the products of combustion isothermally as described above and explained more fully in my U. S. patent application, Serial No. 483,362, filed April 16, 1943.

It is a further object of the present invention to provide an underground storage chamber of a pyramidal form as indicated above, having all sides substantially plain surfaces and the cracks between all such surfaces sealed by liquid means, fully described in and covered by my U. S. patent application, Serial No. 483,362, filed April 16, 1943.

It is a further object of the present invention to provide a huge underground cavern or caverns, whereby air and gas may be compressed continuously, and the gas being compressed, supplemented by gas from storage, may be expanded isothermally at high temperature in a turbine as above described, to produce power greatly in excess of the power required to pump said air and gas.

A further object of the present invention is to refrigerate air or gas previous to storage in a huge underground cavern and to compensate for the heat extracted from the gas during refrigeration by a further lowering of exhaust gases discharged from a turbine after these exhaust gases have already been partially cooled by passing through a heat exchanger arranged to heat the instantly compressed air and gas, and thereafter to heat the refrigerated gas.

It is a further object of the present invention to provide a huge underground gas storage as described above and means to pump gas into this storage at times of light gas useage and to utilize gas from storage during periods of heavy gas usage; and to displace liquid within the chamber by gas during the charging period and to displace gas by liquid during the discharging period whereby the temperature is always maintained within the cavern at a constant value.

Other objects of this invention not at this time more particularly enumerated, will be clearly understood from the following description of the same.

The invention is clearly illustrated in the accompanying drawings in which

Fig. 1 is a view partly in section and partly in elevation of the air and gas storage and utilization equipment.

Fig. 2 is a section along the line A—A of Fig. 1.

Fig. 3 is a view in perspective of the air storage cavern 8 of Fig. 1.

Fig. 4 is an enlarged view in perspective of the cork or stopper 116 of Fig. 3.

Fig. 5 is a plan view of hydraulic pumping station 6.

Fig. 6 is a sectional elevation of a portion of the duct 105 of Fig. 9 and represents a modification of this duct at the bottom.

Fig. 7 shows one method of extending the duct 105 up into the cork or stopper 116.

Fig. 8 is a modified type of stopper.

Fig. 9 is a section in plan along the line A—A of Fig. 3 but showing a different arrangement of pipe 105.

Similar numbers represent similar items in the drawings.

Fig. 1 shows a power plant 1 containing the novel gas turbine 2 described above and more particularly described in my U. S. patent application, Serial No. 483,362, filed April 16, 1943. This gas turbine is designed to maintain a substantially constant temperature in the gases as they expand through the turbine. Turbine 2 is connected to electric generator 12 by coupling 13 and turbine 2 exhausts into duct 3, Fig. 2.

A compressor building 4 is equipped with a multiple stage air compressor with inter-coolers, etc. adapted to compress large quantities of air and to deliver this at close to ambient temperature and at high pressure, say 100 atmospheres, through valve 15 and pipe 29 into the underground cavern 8.

A similar compressor house 5 receives gas from a gas producer 38 through a pipe 41 and compresses this gas to a high pressure, say 100 atmospheres, and delivers it through pipe 28 into gas storage cavern 9. A pipe 31 extends down into cavern 8 almost but not quite to the bottom although it is supported on the bottom. This pipe is conducted at its upper end to a pump house 6, shown in detail in Fig. 5. This pipe 31 either receives liquid, preferably water, from a pump 18 through valve 23, or it delivers this liquid through a valve 22 to a Pelton waterwheel 17. Passages 19 and 20 connect to a reservoir. In a similar manner pipe 32 extends down into but not quite to the bottom of cavern 9 and either accepts power from a pump or delivers it to a Pelton waterwheel in the same manner as above. Pump house 6 is preferably located back in the hills near a large reservoir R adapted to contain or discharge the liquid contents of caverns 8 and 9. Electric motors 16 and 16 serve to drive the pumps or to act as generators and accept power from the Pelton waterwheels, depending on whether the caverns are being discharged or charged. Suitable clutches are provided, as for instance 21, so that a piece of equipment arranged to be connected to the motor and not required to operate at the moment may be disengaged.

The pipe 29 extending from compressor house 4 to the underground air cavern 8 passes through a valve 25 adjacent to refrigerating plant 7. This valve 25 may be closed so as to force the compressed gas to pass through the valve 24, pipe 27a, into the refrigerating plant 7. From the refrigerating plant the cooled compressed air passes through pipe 27b and a second valve 24 back to pipe 29, so that the cooled compressed gas leaving the compressor house 4 is preferably cooled to a temperature just above freezing, say 34 degrees F., and passes to the underground cavern 8. By lowering the temperature the gas density is increased and the amount that may be contained in the cavern 8 is increased by reason of the greater density.

Air passes from the compressor house 4 through pipe 30 to air preheater coil 36 (Fig. 2) during the utilization period and valve 15 in pipe 29 is closed. The pipe 29 coming from the storage cavern on the other hand passes to the upper air preheater 37 and the exhaust gases passing to chimney 11 give up heat to the refrigerated gases coming from storage and passing through the upper preheater 37, so that this stored compressed air when it reaches preheater 36 is at substantially the same temperature as the fresh compressed air coming into preheater 36 from compressor house 4 by the way of pipe 30. The compressed air from both storage and the compressor house 4 is heated up in preheater coil 36, so that when it passes over through the exhaust duct 43 located under the floor, through pipe 34, and arrives at the governor control valve 47, it is at a temperature of approximating 900 degrees F. In a similar manner gas from the gas pumping station 5 through pipe 28a and from the unrefrigerated gas storage 9 passes through pipe 28 to gas preheater coil 35 and from the gas preheater coil through pipe 33 to the gas governor control valve 48. During the utilization period the refrigeration house valves 24, 24 are closed and valve 25 opened so that cold air by-passes refrigerator house 7.

The turbine 2 has its power fluid feed controlled by governor 44. This governor 44 is connected by a rod 68 to a pilot valve 45 of the usual governor controlled type. This pilot valve controls the piston position in the hydraulic operating cylinder 46, and this piston opens and closes the air controlling valve 47 and the gas controlling valve 48 simultaneously. The air passes through an air heater 50 and through the pipe 51 into the turbine intake manifold 60 and from thence it passes into turbine 2. Gas from the control valve 48 passes into the gas manifold 52 and through the hand controlled valves 56, 57, 58 and 59 into the heater 50 and into the manifolds 61, 62 and 63 respectively. The gas passes through valve 56 into heater 50 and at maximum load the valve 56 is adjusted so that the gas entering intake manifold 60 is at a desired high temperature, as for instance approximating 1200 degrees F. As the gas passes from manifold 60 through the turbine toward the position of manifold 61, it will drop slightly in temperature. Gas from manifold 61 is admitted into the turbine through valves controlled by the mechanism 64 so as to mix with the turbine gas stream intermittently and progressively in rotation around the turbine circumference. This gas mixes with the partially burned air in the turbine stream and burns in the turbine stream as the gas passes from the position adjacent to 61 to a position adjacent to 62. By the time gas comes adjacent to manifold 62 the gas is fairly well mixed with the air and mostly consumed. The amount of gas entering manifold 61 is such as to maintain the average temperature of the gases passing from a position adjacent to 61 to a position adjacent to 62, at the desired high temperature, say approximating 1200 degrees F. The admission of gas occurs in a similar manner from manifold 62 and again from manifold 63, so that the gas in passing through the turbine is maintained at a substantially constant desired high temperature, say approximating 1200 degrees F., as fully described in my U. S. patent application, Serial No. 483,362, filed April 16, 1943.

Fig. 3 shows a hydraulic pipe 105 running almost to the bottom of the cavern 8, and supported on the bottom of cavern 8 by a concrete pedestal 106. It is to be understood that when cavern 8 is filled with gas, pipe 105 will be subjected to pneumatic pressure outside, greater than the hydraulic pressure within, and this pipe will preferably be made of reinforced concrete up to a point close to the top of the cavern. Another preferred method of supporting this pipe tied into the side of the cavern is shown in Fig. 9, being a section on A—A, Fig. 3. Fig. 6 shows a method of widening out this pipe 105 at the base and providing a plurality of small openings in the bottom, so that the water may be very shallow in cavern 8 before it uncovers these openings. It will be noted from Fig. 3 that the side walls 101, 102, 103 and 104 are flat surfaces diminishing in size as they approach the apex. A plug or stopper 116 closes the top of the cavern and seals are arranged along all the edges and sides, as fully explained in my U. S. Patent No. 2,384,246, dated September 4, 1945.

The stopper 116 is shown in an enlarged form in Fig. 4 and the method of extending the pipe 105 as shown in Fig. 9 up into the concrete stopper 116 is shown in Fig. 7 together with the upper and lower terminal flanges 120 and 121, and the expansion nipple 122. In Fig. 4 the pipe 105 comes up into the concrete stopper as far as the bottom of the entrance shaft 113. A forged steel head 132 is attached to the top of the pipe 105 where it terminates at the stopper and an entrance manhole 133 is provided at this point. Two drainage outlets 107 and 108 are large shafts which connect the gas drainage channel 114 to the atmosphere. This drainage channel surrounds the bottom of the cork or stopper 116 and is arranged to lead off any fluids which may (by accident) escape from cavern 8. Water is carried to and led from pipe 105 through the dual pipes 31a and 31b and the highly compressed and (if desired) refrigerated gas is led to and taken from the cavern by the pipe 29. A small high pressure pipe 145 supplies fluid to the sealing ducts. The operation of this device is as follows:

On a weekend or a holiday the pumping station 4 will be operated for a relatively long period of time, pumping air through the valve 15 into the cavern 8, while at the same time the pumping station 5 will receive gas from gas producer 38 and pump it through pipes 28a and 28 into cavern 9. During this period the liquid in the bottom of cavern 8 and the bottom of cavern 9 will pass through pipes 31 and 32 respectively and release energy by reason of the high liquid pressure to the Pelton waterwheels 17 and 17 (Fig. 5). These wheels will give up their energy to motors 16 and 16 respectively and these motors will act as asynchronous generators. When it is desired to run turbine 2 (as at heavy load periods), Pelton wheel valves 22, 22 are closed and pump valves 23, 23 are open and the pumps 18, 18 receive power from the motors 16 and 16 and liquid is pumped through pipes 31 and 32 into the bottom of caverns 8 and 9 to displace the air and gas respectively which are passing to turbine 2. If during the compression and storage period, the refrigerating house 7 was in operation, valves 24, 24 will be closed and valve 25 will be open, and cold compressed air will pass from the cavern 8 through pipe 29 and air preheater 37 after which it will mingle with compressed air coming from compressor house 4 and this warmed up air and the freshly compressed air will mingle and pass through preheater coil 36. It will be obvious to one skilled in the art that since the refrigerated air passes in counterflow relation to the exhaust gases passing to the smoke stack 11 through the chamber 40, these compressed gases will be warmed up and the greater weight of flue gases in the chamber 40 will be cooled down approximately half as much as the refrigerated gases are heated, whereby the energy taken out in the refrigeration room 7 is substantially totally returned in the compressed air preheater 37 by heat taken from the spent and partly cooled exhaust gases. In the same manner gas from chamber 9 passes through air preheater 35 in counterflow relation to the hot gases and it is expected that both the air and the gas will be heated up before they reach the turbine valves to a temperature moderately lower than the exhaust gases in duct 43. The hot air and the hot gas pass through the control valves 47 and 48 respectively and mingle. The first mingling is in the air heater chamber 50 where the air passing to the high pressure end of the turbine is heated to approximately 1200 degrees F. As the air passes through the turbine it is repeatedly and intermittently further mixed with gases coming from manifolds 61, 62 and 63 respectively. This gas enters at each point in puffs and the puffs follow each other in succession around the periphery of the turbine at each manifold so that at any instant gases are entering every third hole, that is, the holes will run in rotation 1, 2, 3—1, 2, 3. All the holes marked 1 at any manifold will receive gas simultaneously, followed by simultaneous entrance of gas into holes 2, followed in turn by entrance of gas into holes 3, and repeat. As a result of this action a rather high rate of heating will take place in the stationary blades through which the burning gas and air are passing at the instant, but this heating action will occur only for approximately one-third of the time and for a small fraction of a second per puff. The other two-thirds of the time the gases passing through the turbine will tend to cool down these stationary blades. On the other hand the rotating blades will be passing continuously through the hotter and less hot zones, and they will assume the average desired temperature of the gases, say 1200 degrees. It will be evident to anyone skilled in the art that the purpose of the admission of gas to the working fluid is to produce combustion and heat release in amount and location such that heat is supplied to the working fluid at almost exactly the rate that heat leaves the working fluid, by reason of this leaving heat being transformed into mechanical work.

It will be evident to one skilled in the art that one of my novel underground caverns may be used as a storage chamber for materials other than air and gas. It may obviously be used as a storage reservoir for natural gas at the end of a pipeline, or it may be used to store butane, propane or gasoline at a refinery, or it may be used at approximately minus 116 degrees F. to store liquid methane. It will, however, be obvious to one skilled in the art that if the cavern is to be used as a storage reservoir for methane, the sealing ducts along all the edges of the cavern must be charged with a liquid of low freezing point. It will be evident to one skilled in the art that sampling pipes will be taken from various depths in the cavern so that the fluid in the cavern may be sampled at various depths and the position of the limiting surface between two fluids may be accurately determined by snifting or by other mechanical devices well known to the art.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Means to store fluid under great pressure comprising an underground cavern having flat sides and horizontal cross-sectional area progressively increasing with depth, whereby the weight of the surrounding overburdening earth reacting against the fluid pressure within the cavern at any cross-sectional level is greater than the total upward fluid pressure upon said flat sides at that level.

2. Means to store fluid under great pressure comprising an underground cavern having flat sides and horizontal cross-sectional area increasing progressively with depth, said cavern having one cross-section of minimum safety factor, the weight of the surrounding overburdening earth reacting against fluid pressure at said cross-section being greater than the total upward fluid pressure exerted at that section, whereby sections higher and lower have proportional safety factors.

FRAZER W. GAY.

REFERENCES CITED

The following references are of record in the file of this patent:

UNITED STATES PATENTS

| Number | Name | Date |
|---|---|---|
| 746,242 | Baggaley | Dec. 8, 1903 |
| 955,794 | Harry | Apr. 19, 1910 |
| 1,039,091 | Boyce et al. | Sept. 24, 1912 |
| 1,200,391 | Munn | Oct. 3, 1916 |
| 1,247,520 | Fessenden | Nov. 20, 1917 |
| 1,278,499 | Pelterie | Sept. 10, 1918 |
| 1,629,392 | Killion | May 17, 1927 |
| 1,692,270 | Eastman | Sept. 12, 1933 |
| 2,082,189 | Twomey | June 1, 1937 |
| 2,333,315 | Klingberg | Nov. 2, 1943 |
| 2,341,547 | Heineman | Feb. 15, 1944 |